A. A. WHEELOCK.

Railroad Car Stove.

No. 3,328. Reissued March 16, 1869.

Witnesses:
C. A. Pettit
S. C. Lemon

Inventor:
A. A. Wheelock
by Munn & Co
Attorneys.

N. PETERS. Photo-Lithographer, Washington, D. C.

United States Patent Office.

ARNOLD A. WHEELOCK, OF WASHINGTON, DISTRICT OF COLUMBIA.

*Letters Patent No.* 86,790, *dated February* 9, 1869; *reissue No.* 3,328, *dated March* 16, 1869.

IMPROVEMENT IN RAILROAD-CAR STOVES.

The Schedule referred to in these Letters Patent and making part of the same

*To all whom it may concern:*

Be it known that I, ARNOLD A. WHEELOCK, of Washington, in the District of Columbia, have invented a new and useful Improvement in Safety-Stoves for Railway-Cars; and I do hereby declare that the following is a full, clear, and exact description of the construction and operation of the same, reference being had to the accompanying drawings, making a part of this specification, in which—

Figure 1:
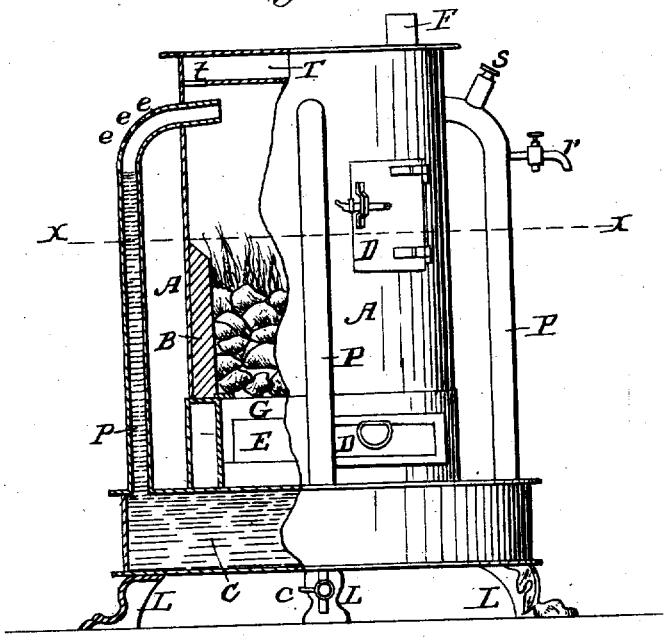
Figure 1 is a side view, a portion of the outer wall having been broken away, to show the interior.
Figure 2:
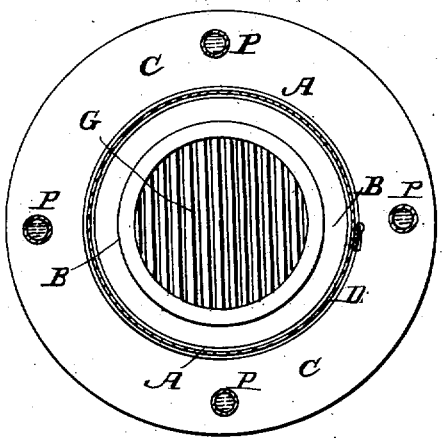
Figure 2 is a horizontal section through line *x x* of fig. 1.

The object of this invention is to construct a stove for railway-cars, in such manner, that if accidentally overturned, from any cause, the coals and ashes will not escape from the stove, but will be instantly extinguished by water; and It consists in the peculiar construction and application of a water-reservoir, having pipes, with openings, stop, and waste-cocks, to a heating-stove.

In the drawings—

A represents the body of the stove, made of either sheet or cast-metal, and in form may be cylindrical, rectangular, or any other shape desirable, and provided with a fire-chamber, the lower part of which is lined with fire-brick B, and with ash-pan E, grate G, doors D D, and smoke-flue F, with such construction as will be best adapted to the shape, or form of the stove.

C is a water-reservoir, constructed to contain a sufficient quantity of water, of any shape, to conform to the base of the stove, and either annular, cylindrical, or angular, as may be, and of considerably greater diameter than the base of the stove, for the purpose of inserting the water-pipes P P.

The stove rests upon the water-reservoir C, which, in turn, is supported by the legs L L.

From near the rim, or periphery of the reservoir, a series of pipes, P P, (two, or any number more desirable,) extends vertically upward, nearly to the top of the fire-chamber, where it bends inward, and passes through the wall of the stove, as seen in fig. 1, its lower end opening into reservoir C, and its upper end into the fire-chamber, near the top of the stove, and at a distance above the fuel therein.

The water in the pipes P P, is never higher than the level of waste-cock *r*.

One or more of these pipes is provided with a waste-cock, *r*, and, above the level of the waste-cock, one of them has a supply-cock, *s*, and through which the water is fed to the reservoir, and all of them have a few small openings, *e e*, for the purpose of allowing any steam that may be generated to escape.

Attached to the bottom of the reservoir, is a drain-cock, *c*, for convenience of drawing off the water when necessary.

The reservoir and pipes may be lined with zinc, lead, or other material, to prevent oxidation, or their inner surfaces may be galvanized, or they may be made wholly of copper, or any suitable material.

In the upper part of the fire-chamber is placed a horizontal screen, T, to prevent any coal, ashes, or fire, from escaping, when the stove is overturned, and suitable openings *t* are provided therein, to admit the smoke; but no openings must be opposite to the flue, for then coals or fire might be communicated through such openings into the flue.

This screen can be made of any suitable metal, either cast or wrought, and strong enough to prevent fracture by the sudden overturn of the stove, or from the coals striking against it.

When the stove is thus constructed, and in the event of an accident to the car, such as to throw the stove upon its side, the water will flow into the fire-chamber through the pipes from the water-reservoir, and extinguish the fire immediately.

In this construction of apparatus, and attached, in the manner described, to a heating-stove, the pipes serve as guards to prevent the clothes of passengers from coming in contact with the stove, as well as to brace and strengthen the stove, and the reservoir acts as ballast, to prevent the stove from being easily-overturned.

Having thus described my invention,

What I claim, and desire to secure by Letters Patent, is—

1. The arrangement of the openings *e e*, waste-cock *r*, and supply-cock *s*, at the upper end of the bent pipes P P, when said pipes are employed substantially as and for the purpose described.

2. The combination of water-reservoir C, conducting-pipes P P, having holes *e e*, water-cock *r*, supply-cocks *s*, with the stove A, having screen T and smoke-openings *t*, all constructed and arranged to operate in the manner and for the purpose substantially as described.

ARNOLD A. WHEELOCK.

Witnesses:

H. N. MYGATT,

PAUL CONNER.